(12) United States Patent
Siew et al.

(10) Patent No.: US 8,924,775 B1
(45) Date of Patent: Dec. 30, 2014

(54) METHODS, DEVICES AND SYSTEMS FOR TRACKING AND RELOCATING INTERMITTENTLY DEFECTIVE DISK SECTORS TO PREVENT INDEFINITE RECYCLING THEREOF

(71) Applicant: Western Digital Technologies, Inc., Irvine, CA (US)

(72) Inventors: Kum Gatt Siew, Shah Alam (MY); Petrus Hu, Petaling Jaya (MY); Siew Lily Yang, Batu Caves (MY)

(73) Assignee: Western Digital Technologies, Inc., Irvine, CA (US)

( * ) Notice: Subject to any disclaimer, the term of this patent is extended or adjusted under 35 U.S.C. 154(b) by 136 days.

(21) Appl. No.: 13/626,107

(22) Filed: Sep. 25, 2012

(51) Int. Cl.
  *G06F 11/00* (2006.01)
  *G06F 11/16* (2006.01)

(52) U.S. Cl.
  USPC ............................. 714/6.13; 714/6.32; 714/54

(58) Field of Classification Search
  CPC ...................... G11B 20/1889; G11B 20/1883
  USPC .................. 714/6.13, 6.3, 6.32, 54, 710, 711
  See application file for complete search history.

(56) References Cited

U.S. PATENT DOCUMENTS

| | | | | |
|---|---|---|---|---|
| 4,694,454 A | * | 9/1987 | Matsuura | 714/6.1 |
| 5,303,219 A | * | 4/1994 | Kulakowski et al. | 369/53.17 |
| 5,369,615 A | * | 11/1994 | Harari et al. | 365/185.19 |
| 5,588,007 A | * | 12/1996 | Ma | 714/719 |
| 6,052,804 A | * | 4/2000 | Thowe et al. | 714/710 |
| 6,118,608 A | * | 9/2000 | Kakihara et al. | 360/53 |
| 6,263,459 B1 | * | 7/2001 | Schibilla | 714/710 |
| 6,289,484 B1 | | 9/2001 | Rothberg et al. | |
| 6,327,106 B1 | * | 12/2001 | Rothberg | 360/53 |
| 6,384,999 B1 | * | 5/2002 | Schibilla | 360/53 |
| 6,393,580 B1 | * | 5/2002 | Harada | 714/2 |
| 6,530,034 B1 | * | 3/2003 | Okada et al. | 714/5.11 |
| 6,539,496 B1 | * | 3/2003 | Peters et al. | 714/6.13 |
| 6,611,393 B1 | * | 8/2003 | Nguyen et al. | 360/53 |
| 6,854,071 B2 | * | 2/2005 | King et al. | 714/6.13 |
| 7,130,138 B2 | * | 10/2006 | Lum et al. | 360/31 |
| 7,274,639 B1 | * | 9/2007 | Codilian et al. | 369/53.17 |
| 7,447,951 B2 | * | 11/2008 | Hwang et al. | 714/710 |
| 7,487,388 B2 | | 2/2009 | Kim et al. | |
| 7,490,263 B2 | * | 2/2009 | King | 714/6.13 |
| 7,770,077 B2 | * | 8/2010 | Arimilli et al. | 714/710 |
| RE41,913 E | * | 11/2010 | King | 714/6.13 |
| 7,929,234 B1 | * | 4/2011 | Boyle et al. | 360/31 |
| 8,069,384 B2 | * | 11/2011 | Wei et al. | 714/723 |
| 8,103,900 B2 | * | 1/2012 | Fry et al. | 714/6.1 |
| 8,190,575 B1 | * | 5/2012 | Ong et al. | 707/650 |
| 2003/0163759 A1 | * | 8/2003 | Arakawa | 714/8 |
| 2004/0030957 A1 | * | 2/2004 | Yadavalli et al. | 714/30 |
| 2008/0148108 A1 | * | 6/2008 | Barnum et al. | 714/54 |

* cited by examiner

*Primary Examiner* — Scott Baderman
*Assistant Examiner* — Paul Contino

(57) ABSTRACT

A data storage device may comprise storage media comprising a plurality of sectors, and a controller configured to selectively read and write data thereto. The controller may be further configured to tag a sector as a bad sector to be relocated after a first failed read and to untag the tagged sector after a successful write attempt after the first failed read. After a second failed read from the sector subsequent to the successful write, the controller may tag the untagged sector as a bad sector to be relocated and adjust a recurring bad sector counter for that sector. On a subsequent write request, based at least in part on the bad sector counter and a threshold, the controller may determine whether to relocate data stored at a physical location on the data storage device corresponding to the sector to a spare location on the data storage device.

24 Claims, 5 Drawing Sheets

METHODS, DEVICES AND SYSTEMS FOR TRACKING AND RELOCATING INTERMITTENTLY DEFECTIVE DISK SECTORS TO PREVENT INDEFINITE RECYCLING THEREOF

BACKGROUND

Conventional disk drives recycle intermittently faulty disk sectors indefinitely. For example, a sector that is tagged as being unreadable but that has not yet been relocated may be reused when the host system overwrites the tagged location and successfully verifies the written data. Indeed, there are disk sectors that are readable most of the time but that may be intermittently unreadable only under certain conditions. Some of these intermittently unreadable sectors may escape the factory defect mapping process. Such disk sectors may be recycled and reused indefinitely, thereby causing the error rate to increase over time. When the error rate reaches a predetermined threshold, the drive's warranty may be triggered.

Conventionally, a disk sector that becomes unreadable after being written may be tagged as a TARE (Transparent Auto Relocation Entry), which establishes a mechanism to enable the drive, under certain circumstances, to re-read and reuse the tagged sector. Once the host system attempts to overwrite the tagged disk sector in an attempt to reuse it, a verification test is performed in which the disk sector is repeatedly written and read to confirm that the tagged sector is, in fact, usable. Unfortunately, some disk sectors are verified to be recycle-worthy when the verification test is carried out, but fail thereafter. Indeed, some sectors may appear to be functional as the signals are refreshed through overwrite during the overwrite test but may lose their integrity after prolonged period of inactivity. These sectors are prone to errors but may, nevertheless be recycled over and over again as long as the verification test is successful.

Data from field returns of disk drives have shown that there are many cases where the same disk sectors are being repeatedly reused and recycled in this fashion, with an incremental increase in the error rate on each read attempt that resulted in an unreadable condition. Conventionally, however, the host system does not appear to take note of the intermittent, albeit sector-consistent, nature of such errors keeps accessing the intermittently faulty disk sector until a check to the SMART Status returns a failure caused by the error rate exceeding the warranty threshold. What are needed, therefore, are methods and data storage devices configured to efficiently handle such intermittent errors.

DETAILED DESCRIPTION

Figure 1:
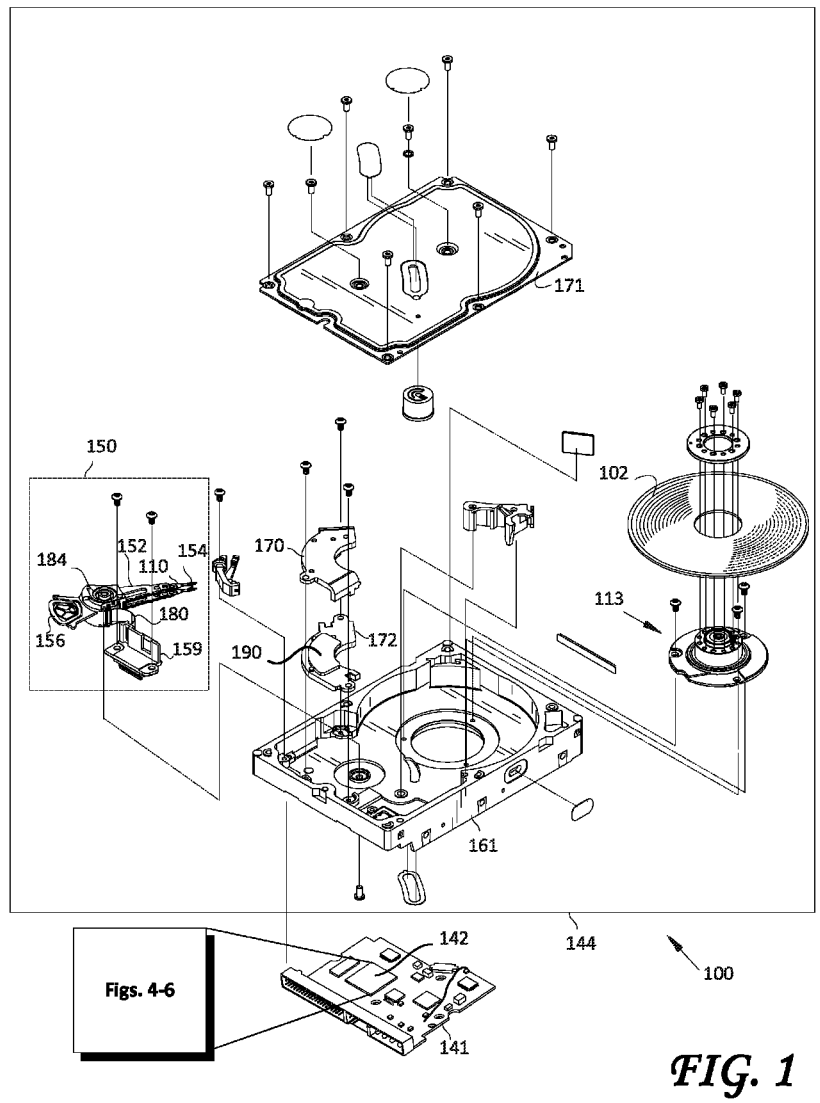
FIG. 1 shows major components of a disk drive, according to one embodiment.

FIG. 1 shows the principal components of an exemplary magnetic disk drive 100 configured for improved margining of detected media defects, according to one embodiment. With reference to FIG. 1, the disk drive 100 comprises a head disk assembly (HDA) 144 and a printed circuit board assembly (PCBA) 141. The HDA 144 may comprise a base 161 and a cover 171 attached to the base 161 that collectively house a disk 102 or a stack of two or more such disks 102. The HDA 144 also includes a spindle motor 113 attached to the base 161 for rotating the disk 102, an HSA 150, and a pivot bearing cartridge 184 that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to a load beam that includes a flexure and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s) 154. The flex circuit cable assembly may include the flexible cable 180 and a flex clamp 159. The HSA 150 is pivotally secured to the base 161 via the pivot-bearing cartridge 184 so that the slider at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the tracks per inch (TPI) density on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor (VCM). The VCM causes the HSA 150 to pivot about the actuator pivot axis to cause the slider and the read-write heads thereof to sweep radially over the disk(s) 102. The PCBA 141 includes a processor 142 and control circuitry configured to read data from and write data to the disk(s) 102 and to carry out the methods for tracking and relocating intermittently defective disk sectors to prevent indefinite recycling thereof described and shown herein relative to FIGS. 4-6.

Figure 2:
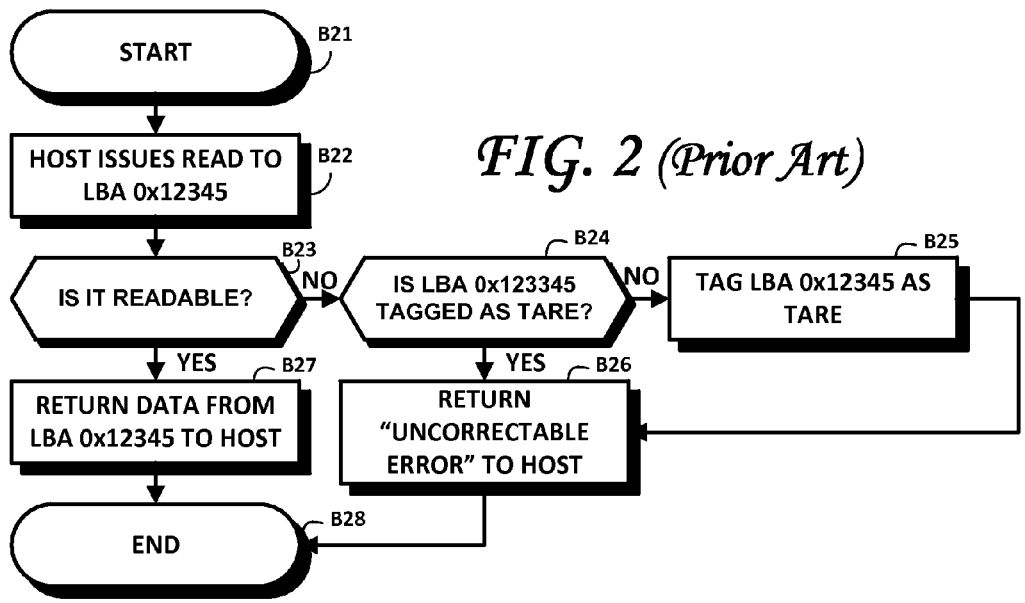
FIG. 2 is a flowchart showing a conventional error recovery during a read cycle.

FIG. 2 is a flowchart showing a conventional error handling process during a read cycle, in which a disk sector is tagged as TARE upon an unsuccessful read and remains tagged as TARE if the subsequent read is unsuccessful. Indeed, the conventional error handling process in a read cycle begins at Block B21, whereupon the host issues a read to an arbitrary (for purposes of explanation) logical block unit (LBA) denoted by 0x12345 (Block B22). The drive then seeks to LBA 0x12345 and, at Block B23, determines whether LBA 0x12345 is readable. If LBA 0x12345 is readable, the data stored at LBA 0x12345 is returned to the host at B27, whereupon the process ends at B28. If, however, it is determined that LBA 0x12345 is not readable in Block B23, it is next determined whether the sector is tagged as a TARE, as shown at B24. If LBA 0x12345 is, in fact, tagged as a TARE, the drive returns an "Uncorrectable Error" message to the host, as shown at B26. If the unreadable sector is not already tagged as a TARE, it is so tagged, as shown at Block B25, whereupon the same "Uncorrectable Error" message is returned to the host, as shown at B26. The process ends at B28.

Figure 3:
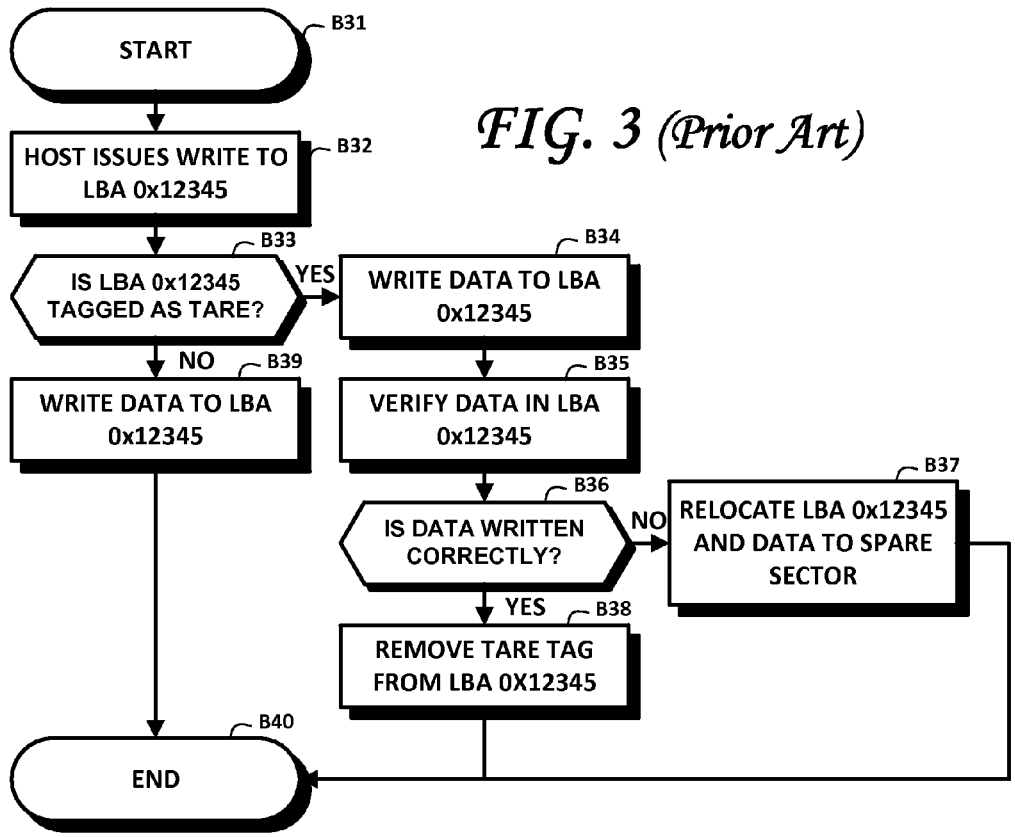
FIG. 3 is a flowchart showing a conventional error recovery during a write cycle.

FIG. 3 is a flowchart showing a conventional error handling process during a write cycle. As shown in FIG. 3, if the data is verified to be successfully written, the TARE tag is removed from the disk sector; or else the disk sector is relocated or replaced with a spare sector. Any subsequent access to the relocated disk sector will access the spare sector as replacement. Indeed, the conventional error handling process in a write cycle begins at Block B31, whereupon the host issues a write command, to arbitrary (again, for purposes of explanation) LBA 0x12345, as shown at B32. At Block B33, it is determined whether LBA 0x12345 is tagged as a TARE. If not (NO branch of B33), the data is written to the LBA 0x12345 and the process ends at Block B40. If, however, the LBA 0x12345 is tagged as a TARE (YES branch of Block B33), a write attempt is carried out at B34 to write data to LBA 0x12345, despite the LBA being tagged as a TARE. As shown at Block B35, the data written to LBA 0x12345 is then verified by, for example, reading back the data stored at LBA 0x12345 and comparing it with the data that was written. At Block B36, it is determined whether the data was correctly written. If not (NO branch of B36), the data stored at LBA 0x12345 is relocated, as called for by Block B37 and an exception list updated to indicate that LBA 0x12345 is not a valid sector to read from or write to and to indicate the address where the data was relocated. If the written to LBA 0x12345 was successfully verified at Block B36, the TARE tag may be removed from LBA 0x12345 (Block B38), as that sector now appears to be functional to store data, despite its previous TARE tag. The process ends at Block B40. Notwithstanding Block B38, it is possible that LBA 0x12345 may fail in the future under certain conditions, and such failure may occur repeatedly, if not always predictably. Therefore, it is possible that LBA 0x12345 may be again tagged as a TARE, and thereafter written to and successfully verified. Such intermittent error may cause an incremental increase of the drive's error rate over time, until such time as the warranty threshold is reached, and eventually returned to the manufacturer or discarded.

One embodiment intermittently logs faulty disk sectors and relocates them after a finite cycle of reuse. In this manner, one embodiment functions as a failure analysis enabler and provides data to enable finding the root causes of the intermittent un-readability of certain disk sectors.

Figure 4:
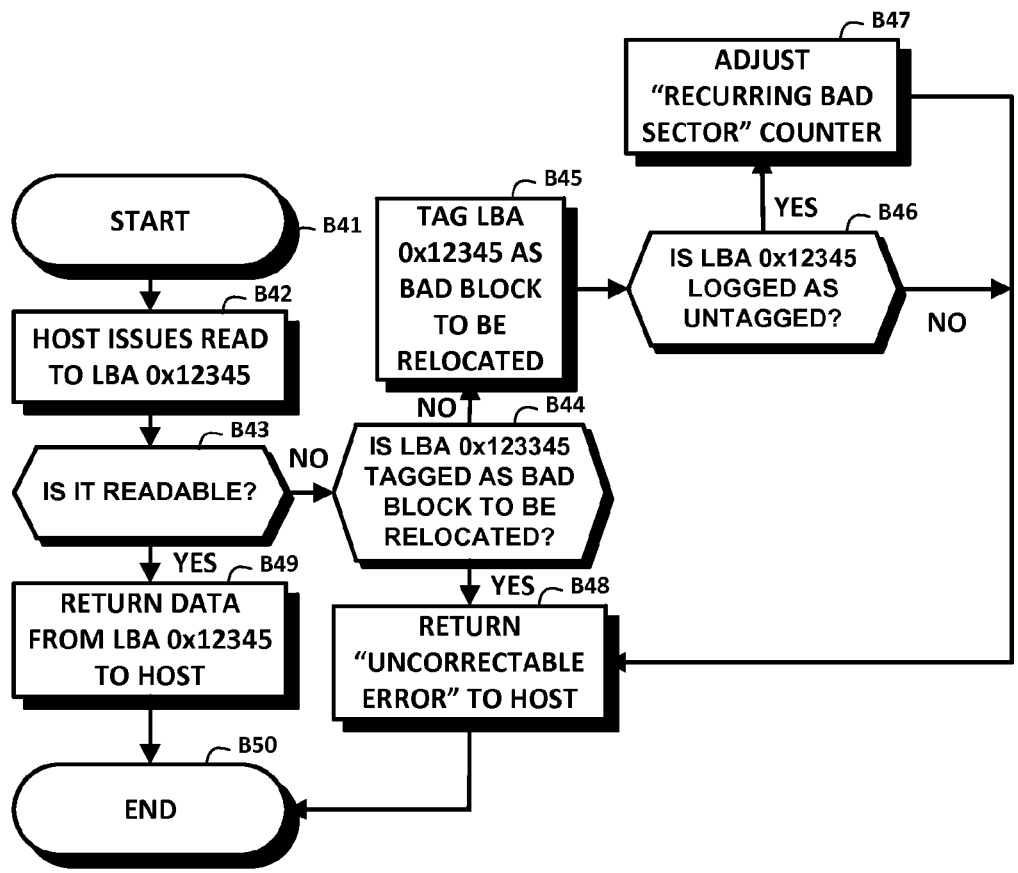
FIG. 4 is a flowchart showing a method for intermittent error handling during a read cycle, according to one embodiment.

Accordingly, one embodiment is a method of reading sectors of a storage device. FIG. 4 is a flowchart showing a method and functionality for intermittent error recovery during a read cycle, according to one embodiment. As shown, the method begins at Block B41, in which the host is detected to have issued a read command to, e.g., arbitrary LBA 0x12345, as shown at B42. The storage device then seeks to the target sector, in this case LBA 0x12345, and attempts to read the data stored therein. At B43, it is determined whether the LBA 0x12345 is readable. If the attempt is successful—that is, if LBA 0x12345 is readable (YES branch of B43), the data stored therein is returned to the host in fulfillment of the issued read command, as shown at B49. If the data at LBA 0x12345 is not readable (NO branch of B43), it is then is determined whether LBA 0x12345 is tagged as a bad block to be relocated, as shown at B44. The tagging of the LBA 0x12345 as a bad block to be relocated may comprise tagging the LBA 0x12345 as a TARE, or may comprise otherwise associating LBA 0x12345 with some other error marker, which configures a subsequent relocation (or marking for a subsequent relocation) of the data stored at the target sector. For example, the error marker may configure the target sector to be marked for relocation (or relocated) to a spare or reserve location upon a subsequent or next write operation, as is discussed relative to FIG. 5. As shown at the YES branch of B44, if the LBA 0x12345 is tagged as a bad block to be relocated (e.g., as a TARE or as some other functionally similar error marker) as shown at B48, the storage device may then return a message to the host. The message may be indicative, for example, of an uncorrectable error, as shown at B48.

If the LBA 0x12345 is not tagged as a bad block to be relocated, as shown at the NO branch of B44, the LBA 0x12345 may be tagged as a bad block to be relocated (e.g., as a TARE or as some other functionally similar error marker), as shown at B45. As shown at B46, it may then be determined whether the LBA 0x12345 was previously logged as having been untagged as a bad block to be relocated. If the LBA 0x12345 has indeed been logged as having been untagged as a bad block (YES branch of B46), a recurring bad sector counter for LBA 0x12345 may be adjusted, as shown at Block B47. If the LBA 0x12345 has not been logged as having been untagged as a bad block (NO branch of B46) or after the recurring bad sector counter has been adjusted in Block B47, the method may revert to Block B48 and may return a message to the host. The message to the host may comprise an indication of uncorrectable error for LBA 0x12345, as shown at B48. In this manner, an LBA that had been initially tagged as a TARE, for example, and then untagged because of a subsequent satisfactory write verify, is distinguished from a LBA that has not been tagged as a TARE. This distinction enables tracking of LBAs that could potentially be recycled indefinitely and cause the problems stated above From either Block B49 or B48, the method may proceed to Block B50, signaling the end of the read cycle.

Each time a sector untagged as a bad block, a log may be updated with, for example, the LBA of the tagged or untagged block, the number of times when the sector in question has been re-tagged as a bad block to be relocated and any error code encountered when the sector is tagged as a bad block to be relocated.

Figure 5:
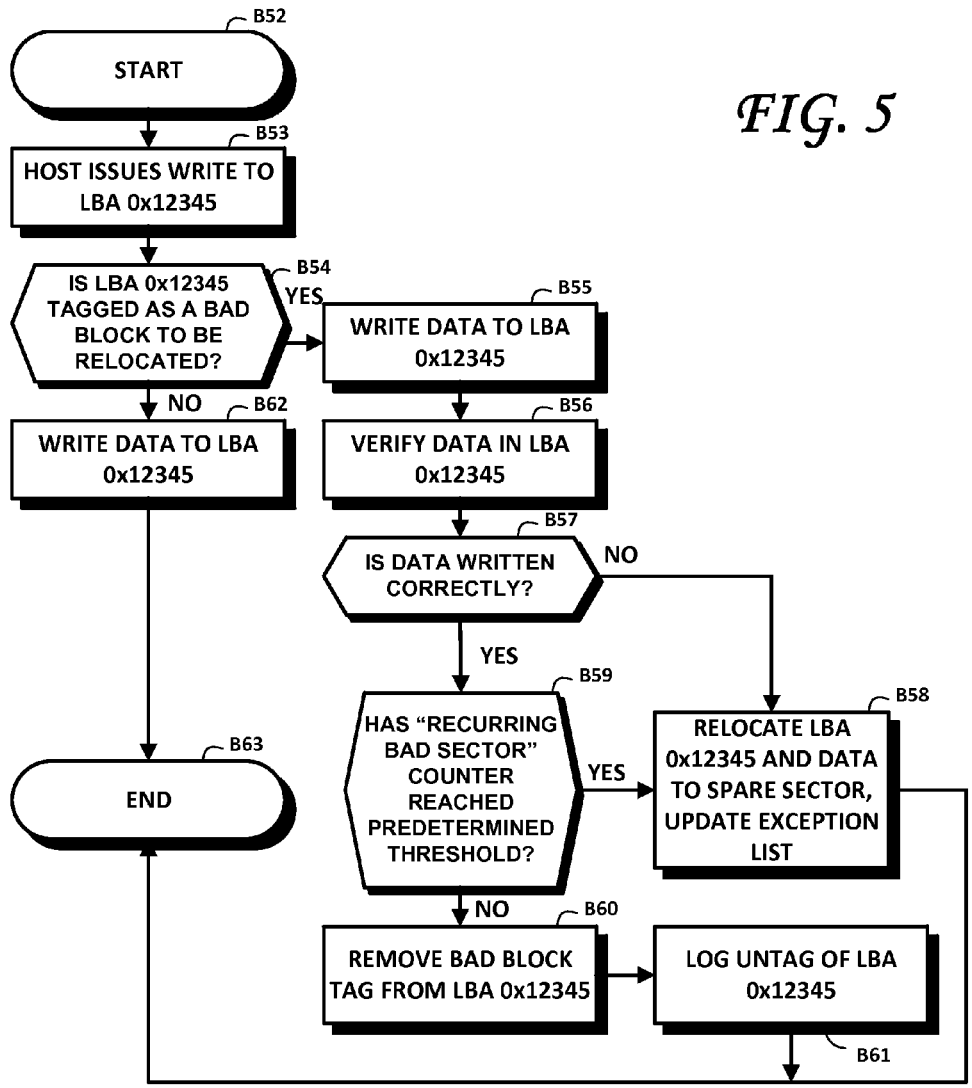
FIG. 5 is a flowchart showing a method for intermittent error handling during a write cycle, according to one embodiment.
Figure 6:
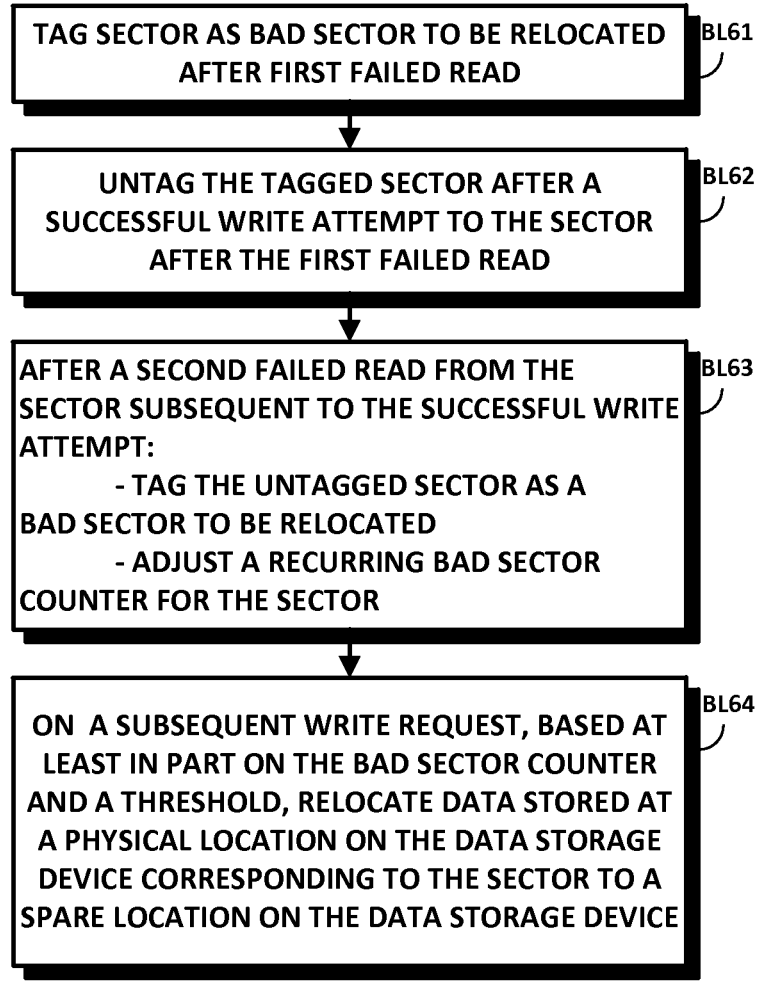
FIG. 6 is a flowchart showing a method for intermittent error handling, according to one embodiment.

FIG. 5 is a flowchart showing a method of writing to a sector of a data storage device and for intermittent error handling during a write cycle, according to one embodiment. As shown, the method starts at B52, whereupon it may be determined that the host has issued a data access command, such as a write command to an arbitrary LBA, say LBA 0x12345, as shown at Block B53. At Block B54, it may be determined whether LBA 0x12345 is tagged as a bad block to be relocated. The LBA 0x12345 tagged as a bad block to be relocated may be tagged as a TARE, or the sector may be otherwise associated with some other error marker, which configures a subsequent relocation or marking for relocation of the data stored at the target sector. For example, the error marker may configure the target sector to be relocated to a spare or reserve location upon a subsequent or next write operation. If LBA 0x12345 is not tagged as a bad block (NO branch of B54), data may be written to the LBA 0x12345, in fulfillment of the host-issued write command, as shown at B62

If, however, LBA 0x12345 is tagged as a bad block to be relocated, (YES branch of B54), data is written to LBA 0x12345, as shown at B55. Thereafter, the data written to LBA 0x12345 may be verified, as called for at Block B56. A determination may then be made, as shown at Block B57, whether the data was written correctly to LBA 0x12345. If the data was, in fact, written correctly to LBA 0x12345, (YES branch of B57), it may then be determined whether the recurring bad sector counter for LBA 0x12345 (adjusted at B47 in FIG. 4) has reached a predetermined threshold, as shown at B59. If the recurring bad sector counter for LBA 0x12345 has not reached the predetermined threshold (NO branch of B59), the bad block tag (tagged at block B45 in FIG. 4, for example) may be removed from LBA 0x12345, as shown at B60. Thereafter, a log(e.g., the log consulted in Block B46 of FIG. 4) may be updated with the fact that LBA 0x12345 has been untagged, as shown at B61. If, however, the recurring bad sector counter is determined, in Block B59, to have reached the predetermined threshold (YES branch of B59), the LBA 0x123245, and any data stored there, may be relocated to a spare sector and the exception list may be updated to indicate that LBA 0x12345 is not a valid sector to read from or write to and to indicate the address where is the data was relocated, as shown at B58. After the relocation of the LBA 0x12345 and its data of B58 or the untagging of the LBA 0x12345 of B61, the method may proceed to Block B63, signaling the end of the write cycle.

Collectively, FIGS. 4 and 5 define a method of operating a storage device coupled to a host. According to one embodiment of a method for intermittent error handling shown in FIG. 6, such a method may comprise tagging a sector as a bad sector to be relocated after a first failed read, as shown at Block BL61. As shown at Block BL62, the tagged sector may be untagged after a successful write to the sector after the first failed read. This untagging may be recorded in a log. As shown at BL63, after a second failed read from the sector subsequent to the successful write, the untagged sector may be tagged as a bad sector to be relocated and a recurring bad sector counter for the sector may be adjusted (e.g., an up-counter incremented or a down-counter decremented, as appropriate). On a subsequent read request, based at least in part on the bad sector counter and a threshold, it may be determined whether to relocate data stored at a physical location on the data storage device corresponding to the bad sector to a spare location on the data storage device, as called for by Block BL64. Further writes to the physical location corresponding to the bad sector may thereafter be disallowed.

According to one embodiment, the above described methods may reduce the rate of field returns of storage devices caused by recurring but intermittent errors tripping a warranty maximum. For example, one embodiment may reduce field returns by reducing recurring TARE entries tripping an Error Rate Self-Monitoring, Analysis and Reporting Technology (SMART) attribute. Moreover, the log of untagged sectors (referred to in Block B46 in FIG. 4 and in Block B61 in FIG. 5) provides a list of intermittently faulty disk sectors for failure analysis. This facilitates the task of determining the reason for the error intermittency and of eliminating the cause thereof through more intelligent defect mapping methods. One embodiment may be implemented as firmware, for example, within the controller 142 of FIG. 1.

While certain embodiments of the disclosures have been described, these embodiments have been presented by way of example only, and are not intended to limit the scope of the disclosures. Indeed, the novel methods, devices and systems is described herein may be embodied in a variety of other forms. Furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures. For example, those skilled in the art will appreciate that in various embodiments, the method of tagging and untagging sectors may differ from those shown in the figures and described herein above. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
   storage media comprising a plurality of sectors configured to store data; and
   a controller configured to selectively read and write data to the plurality of sectors, the controller being further configured to:
   tag a sector of the plurality of sectors as a bad sector to be relocated after a first failed read;
   untag the tagged sector after a successful write attempt to the sector after the first failed read, a successful write attempt being a write attempt, carried out after a prior failed read, in which data written to the tagged sector is successfully verified;
   after a second failed read from the sector subsequent to the successful write:
     tag the untagged sector as a bad sector to be relocated;
     adjust a recurring bad sector counter for the sector; and
     on a subsequent write request, consult a log detailing previous tagging and untagging of the plurality of sectors, and based at least in part on the consulted log, the bad sector counter and a threshold, determine whether to relocate data stored at a physical location on the data storage device corresponding to the sector to a spare location on the data storage device.

2. The data storage device of claim 1, wherein the controller is further configured to relocate data stored at a physical location on the data storage device corresponding to the sector to a spare location on the data storage device when the bad sector counter reaches the threshold.

3. The data storage device of claim 1, wherein the controller is further configured to disallow further reads or writes to the physical location on the data storage device corresponding to the sector.

4. The data storage device of claim 1, wherein the controller is further configured to tag the sector as a Transparent Auto-Relocation Entry (TARE).

5. The data storage device of claim 1, further comprising, after the second failed read, returning a message to a host coupled to the data storage device.

6. The data storage device of claim 5, wherein the message comprises an indication that an uncorrectable read error has occurred.

7. The data storage device of claim 1, wherein the threshold is at least two.

8. The data storage device of claim 1, wherein the storage media comprises a rotating media storage device.

9. A method of reading a sector of a storage device, comprising:
   attempting to read the sector upon receipt of a read command from a host;
   if the attempted read is unsuccessful:

tagging the sector as a bad sector to be relocated and correspondingly recording the tagging of the sector in a log detailing previous tagging and untagging of sectors of the storage device;

if the sector was logged in the log as having been previously untagged as a bad sector to be relocated after a successful write in which data written to a previously tagged sector is successfully verified, adjusting a recurring bad sector counter for the sector, and returning a message to the host.

10. The method of claim 9, wherein tagging comprises tagging the sector as a Transparent Auto-Relocation Entry (TARE).

11. The method of claim 9, further comprising untagging the sector upon successfully writing to the tagged sector and correspondingly updating the log with the untagging of the sector.

12. The method of claim 9, wherein the message returned to the host comprises an indication that an uncorrectable read error has occurred.

13. The method of claim 9, further comprising relocating data stored at the sector after the recurring bad sector counter has reached a predetermined threshold.

14. The method of claim 13, wherein the predetermined threshold is at least two.

15. The method of claim 9, wherein the sector is associated with a Logical Block Address (LBA).

16. A method of writing to a sector of a data storage device, comprising:
    determining whether the sector is tagged as a bad sector to be relocated:
    if the sector is not tagged as a bad sector to be relocated, writing to the sector;
    if the sector is tagged as a bad sector to be relocated:
    attempting to write to the tagged sector and,
    if the write to the tagged sector was successful such that data written to the tagged sector is successfully verified, untagging the sector and logging the untagging of the sector in a log detailing previous tagging and untaggings of sectors of the data storage device; and
    if the write to the tagged sector was unsuccessful, relocating data stored at a physical location on the data storage device corresponding to the sector to a spare location on the data storage device.

17. The method of claim 16, wherein the tagged sector is associated with a Transparent Auto-Relocation Entry (TARE).

18. The method of claim 16, wherein the sector is associated with a Logical Block Address (LBA).

19. A method of operating a data storage device, comprising:
    tagging a sector as a bad sector to be relocated after a first failed;
    untagging the tagged sector after a successful write attempt to the sector after the first failed read, a successful write attempt being a write attempt, carried out after a prior failed read, in which data written to the tagged sector is successfully verified;
    after a second failed read from the sector subsequent to the successful write attempt, as determined after consulting a log detailing previous tagging and untagging of sectors of the data storage device:
    tagging the untagged sector as a bad sector to be relocated;
    adjusting a recurring bad sector counter for the sector; and
    relocating data stored at the sector to a spare location on the data storage device after the recurring bad sector counter has reached a predetermined threshold.

20. The method of claim 19, wherein relocating comprises disallowing further reads or writes to a physical location on the data storage device corresponding to the sector.

21. The method of claim 19, wherein tagging comprises tagging the sector as a Transparent Auto-Relocation Entry (TARE).

22. The method of claim 19, further comprising, after the second failed read, returning a message to a host coupled to the storage device.

23. The method of claim 22, wherein the message comprises an indication that an uncorrectable read error has occurred.

24. The method of claim 19, wherein the threshold is at least two.

* * * * *